United States Patent
Kuang et al.

(10) Patent No.: US 10,012,804 B2
(45) Date of Patent: Jul. 3, 2018

(54) BEND INDUCING FIBER ARRAY UNIT

(71) Applicant: Alliance Fiber Optic Products, Inc., Sunnyvale, CA (US)

(72) Inventors: Wen-Lung Kuang, New Taipei (TW); Yao Li, Newark, CA (US); Ximao Feng, San Mateo, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/581,195

(22) Filed: Apr. 28, 2017

(65) Prior Publication Data

US 2017/0343743 A1 Nov. 30, 2017

Related U.S. Application Data

(60) Provisional application No. 62/392,312, filed on May 27, 2016.

(51) Int. Cl.
  *G02B 6/36* (2006.01)
  *G02B 6/38* (2006.01)
  *G02B 6/44* (2006.01)

(52) U.S. Cl.
  CPC ......... *G02B 6/3885* (2013.01); *G02B 6/3829* (2013.01); *G02B 6/4403* (2013.01)

(58) Field of Classification Search
  CPC ... G02B 6/3829; G02B 6/3885; G02B 6/4403
  USPC ...................................... 385/76–78, 81, 83
  See application file for complete search history.

(56) References Cited

U.S. PATENT DOCUMENTS

| | | | |
|---|---|---|---|
| 6,116,791 A * | 9/2000 | Laninga | G02B 6/3829 385/83 |
| 6,402,389 B1 * | 6/2002 | Steijer | G02B 6/3829 385/114 |
| 7,428,364 B2 | 9/2008 | Tourne | |
| 7,527,435 B2 | 5/2009 | Dean, Jr. et al. | |
| 7,802,927 B2 | 9/2010 | Benjamin et al. | |
| 7,802,977 B2 | 9/2010 | Schröter et al. | |
| 8,485,738 B2 * | 7/2013 | Rosenberg | G02B 6/3829 385/71 |
| 9,500,820 B2 * | 11/2016 | Huang | G02B 6/4212 |

(Continued)

FOREIGN PATENT DOCUMENTS

| | | |
|---|---|---|
| CN | 201828681 U | 5/2011 |
| JP | 2012230399 A | 11/2012 |
| JP | 5342678 B2 | 11/2013 |

*Primary Examiner* — Robert Tavlkaev
(74) *Attorney, Agent, or Firm* — Robert L. Branham

(57) ABSTRACT

A bend inducing fiber array unit is provided comprising first and second anti-recovery plates and a V-groove chip. Opposing lateral anti-recovery plates are arranged on opposite sides of the first and second anti-recovery plates. Lateral edges on a common side of the anti-recovery plates are secured to a common face of one of the opposing lateral anti-recovery plates to fix the first and second anti-recovery plates relative to each other. A guided portion of the array of optical fibers is positioned in the fiber accommodating grooves of the V-groove chip and the V-groove chip is secured to the second anti-recovery plate such that the fiber accommodating grooves and a fiber guiding face of the first anti-recovery plate are fixed at a relative angle θ approximating the bend in the array of optical fibers.

16 Claims, 3 Drawing Sheets

(56) References Cited

U.S. PATENT DOCUMENTS

| | | | |
|---|---|---|---|
| 2012/0106900 A1* | 5/2012 | Hou ................... | G02B 6/3885 |
| | | | 385/83 |
| 2014/0010499 A1* | 1/2014 | Suematsu ............ | G02B 6/3881 |
| | | | 385/65 |
| 2016/0252681 A1 | 9/2016 | Ishiguro et al. | |
| 2017/0123164 A1* | 5/2017 | Suematsu ............ | G02B 6/3829 |

* cited by examiner

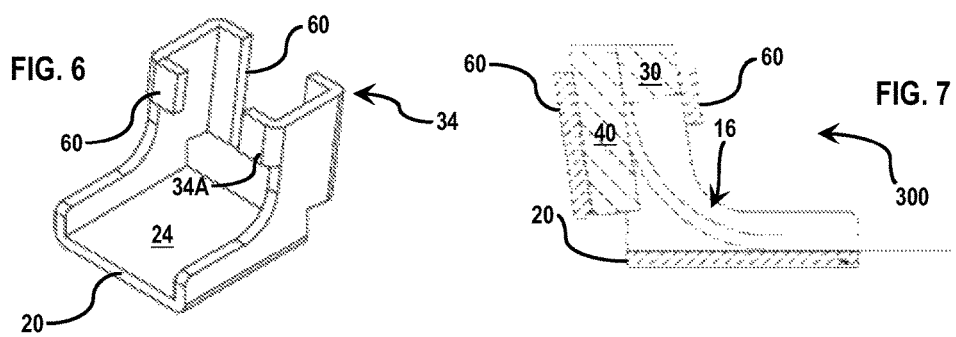
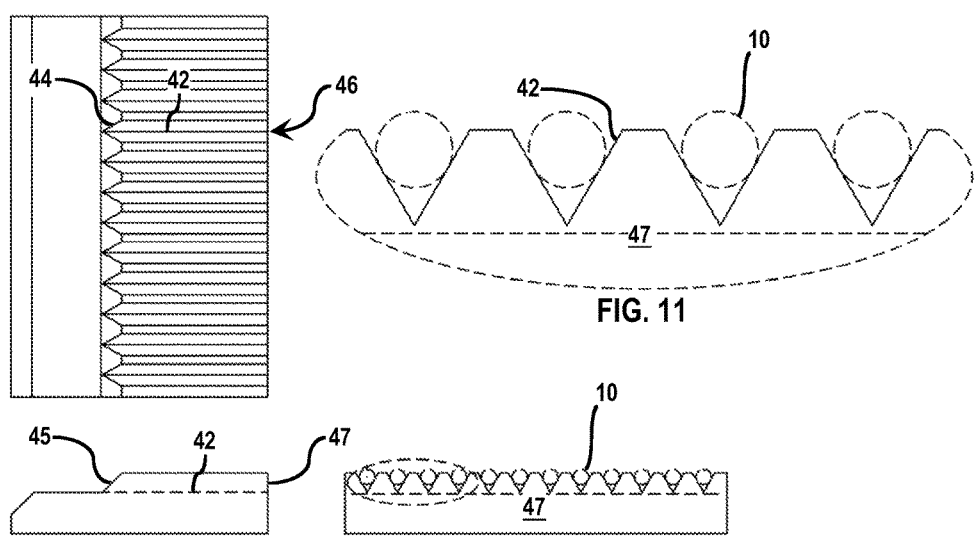
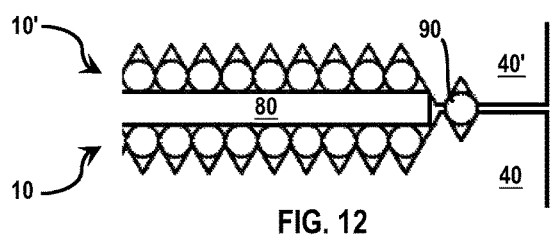

BEND INDUCING FIBER ARRAY UNIT

CROSS-REFERENCE TO RELATED APPLICATIONS

This application claims the benefit of U.S. Provisional Application Ser. No. 62/392,312, filed on May 27, 2016.

BACKGROUND

Field

The present disclosure relates to fiber array units and, more particularly, to fiber array units designed to introduce bends in the fiber array where a collective directional change in the layout of the fiber array is required for a particular application. Typically, it is challenging to design these types of assemblies to satisfy industry requirements in coherent and related communication system subassemblies for advanced telecommunications systems.

Technical Background

A variety of solutions exist for incorporating directional changes in the layout of an optical fiber array. For example, U.S. Pat. No. 7,802,977 and U.S. Pat. No. 7,527,435 teach solutions in the context of optical fiber connectors, which are used in a variety of applications where a set of one or more optical fibers needs to be connected to an external device, such as another set of one or more optical fibers, a circuit board, or an apparatus adapted to receive and transmit light. U.S. Pat. No. 7,428,364 is more generally related to connecting an optical fiber to a backplane, but is similarly concerned with introducing a right angle bends into the fiber. These patents and others, like U.S. Pat. No. 6,402,389 and JP 5342678 B2, are introduced to show some of the many applications in which the technology of the present disclosure may be employed but are not introduced herein to limit the scope or field of use of the technology disclosed and claimed herein.

BRIEF SUMMARY

The present inventors have recognized a continuing drive to improve the performance and stability of solutions for incorporating directional changes in the layout of optical fiber arrays.

In accordance with one embodiment of the present disclosure, a bend inducing fiber array unit is provided comprising an array of optical fibers comprising an array of input axes, an array of output axes, and a bend in the array of optical fibers between the input axes and the output axes. Input-side and output-side anti-recovery plate are provided and a V-groove chip is provided comprising a plurality of fiber accommodating grooves to define a plurality of V-shaped entrances on an input edge of the V-groove chip and a plurality of V-shaped exits on an output edge of the V-groove chip. Opposing lateral anti-recovery plates are arranged on opposite sides of the input and output-side anti-recovery plates. Each of the input and output-side anti-recovery plates comprises a pair of lateral edges positioned on opposite sides of the array of optical fibers. Lateral edges on a common side of the input and output-side anti-recovery plates are secured to a common face of one of the opposing lateral anti-recovery plates to fix the input and output-side anti-recovery plates relative to each other. A guided portion of the array of optical fibers is positioned in the fiber accommodating grooves of the V-groove chip. The V-groove chip is secured to the fixed output-side anti-recovery plate such that the fiber accommodating grooves and a fiber guiding face of the input-side anti-recovery plate are fixed at a relative angle θ.

In accordance with another embodiment of the present disclosure, a bend inducing fiber array unit is provided where the input-side anti-recovery plate comprises a staging area along a portion of the array of optical fibers corresponding to the array of input axes of the array of optical fibers and the fiber array unit further comprises a bonding agent securing the array of optical fibers to the staging area of the input-side anti-recovery plate. The staging area of the input-side anti-recovery plate is clear of interference by the output-side anti-recovery plate or any structure secured between the opposing lateral anti-recovery plates. A guided portion of the array of optical fibers is positioned in the fiber accommodating grooves of the V-groove chip and the V-groove chip is secured to the fixed output-side anti-recovery plate such that the fiber accommodating grooves and a fiber guiding face of the input-side anti-recovery plate are fixed at a relative angle θ. The the array of output axes of the array of optical fibers and the output edge of the v-groove chip terminate at a common face of the bend inducing fiber array unit to define a multi-fiber ferrule.

In accordance with yet another embodiment of the present disclosure, a bend inducing fiber array unit is provided comprising a bend in the array of optical fibers between the first and second arrays of optical axes of the fiber array. First and second anti-recovery plates and a V-groove chip are provided. The V-groove chip comprises a plurality of fiber accommodating grooves extending across the V-groove chip to define a plurality of first V-shaped entrances on a first edge of the V-groove chip and a plurality of second V-shaped exits on a second edge of the V-groove chip. Opposing lateral anti-recovery plates are arranged on opposite sides of the first and second anti-recovery plates. Each of the anti-recovery plates comprises a pair of lateral edges positioned on opposite sides of the array of optical fibers. Lateral edges on a common side of the anti-recovery plates are secured to a common face of one of the opposing lateral anti-recovery plates to fix the first and second anti-recovery plates relative to each other. A guided portion of the array of optical fibers is positioned in the fiber accommodating grooves of the V-groove chip and the V-groove chip is secured to the second anti-recovery plate such that the fiber accommodating grooves and a fiber guiding face of the first anti-recovery plate are fixed at a relative angle θ.

It is noteworthy that the bend inducing fiber array units described herein allow for a convenient and precise means of manufacture and assembly because the V-grooves of the V-groove chip can be formed with optimum manufacturing precision and can be placed in the fiber array assembly in a variety of configurations with optimum adaptability. This type of technical advance is not present in devices where V-grooves are formed in relatively complex or otherwise prohibitive non-planar components, like the 90 degree ferrule of JP 5342678 B2 or the alignment members of the other patent references noted above.

Although the concepts of the present disclosure are described herein with primary reference to imparting 90 degree, or close to 90 degree bends in a fiber array, it is contemplated that the concepts will enjoy applicability to any degree of directional change to be imparted in an optical fiber array, including embodiments where a succession of directional changes are imparted in an optical fiber array. It is further contemplated that, although the concepts of the present disclosure are described herein with primary reference to a fiber array that terminates at an output edge of the fiber array unit, the concepts of the present disclosure will enjoy applicability to fiber array units where the fibers extend beyond the output edge of the unit.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIGS. 6 and 7 illustrate a bend inducing fiber array unit according to a further alternative embodiment of the present disclosure.

FIGS. 8-11 illustrate the structural detail of one example of a suitable V-groove chip according to the present disclosure; and FIG. 12 illustrates the structural detail of a stacked array configuration of the present disclosure.

DETAILED DESCRIPTION

Figure 1:
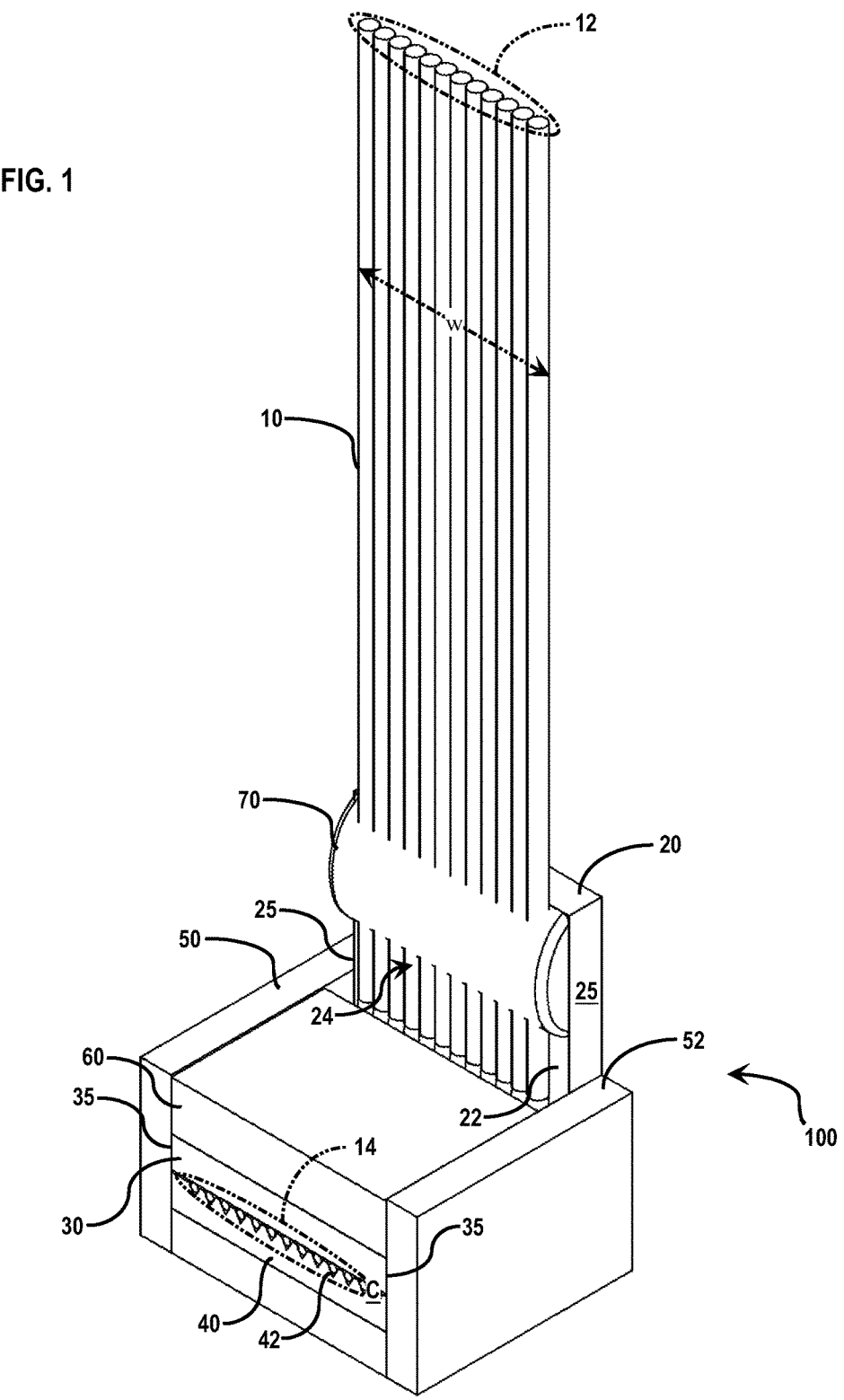
FIGS. 1-3 illustrate a bend inducing fiber array unit according to one embodiment of the present disclosure.
Figure 2:
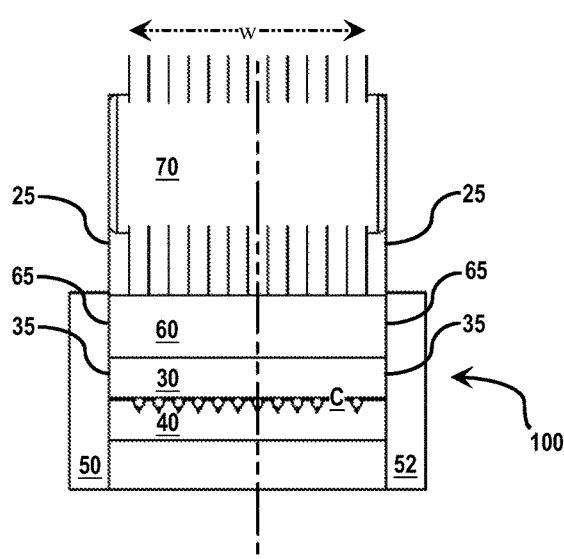
Figure 3:
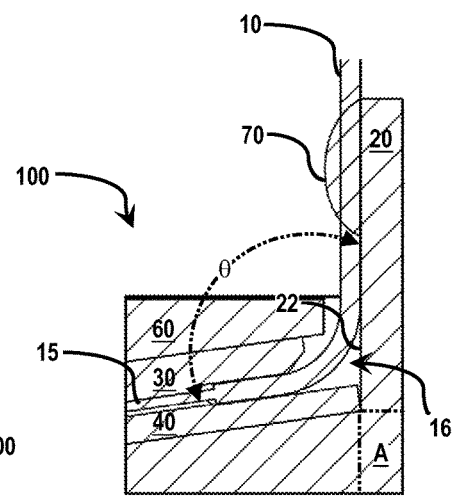

Referring initially to FIGS. 1-3, a bend inducing fiber array unit 100 according to one embodiment of the present disclosure is illustrated, and comprises an array of optical fibers 10, an input-side anti-recovery plate 20, an output-side anti-recovery plate 30, a V-groove chip 40, and first and second lateral anti-recovery plates 50, 52.

The array of optical fibers 10 comprises an array of input axes 12, an array of output axes 14, and a bend 16 between the input axes 12 and the output axes 14. The bend 16 extends across a width dimension w of the array of optical fibers 10. The respective arrays may be one or two-dimensional arrays of uniformly or non-uniformly spaced fibers. For example, in the illustrated embodiment, the array of input axes is presented as a one-dimensional array of uniformly spaced fibers, which may be conveniently formed into a fiber ribbon. The opposing lateral anti-recovery plates 50,52 are arranged on opposite sides of the input and output-side anti-recovery plates 20, 30.

The V-groove chip 40, an embodiment of which is illustrated in further detail in FIGS. 8-11, comprises a plurality of fiber accommodating grooves 42 extending across the V-groove chip 40 to define a plurality of V-shaped entrances 44 (see FIG. 8) on an input edge 45 of the V-groove chip 40 and a plurality of V-shaped exits 46 (see FIG. 8) on an output edge 47 of the V-groove chip 40. As is illustrated with particularity in FIGS. 10 and 11, it is noted that the fiber accommodating grooves 42 and the corresponding V-shaped entrances 44 and exits are, in some embodiments, only deep enough to accommodate a portion of the entire cross section of the individual fibers of the optical array 10. It is also noted that, although reference is made herein to a "V-grooved" chip and "V-shaped" entrances/exits, these terms are not strictly limited to grooves that exclusively define a simple, linear, uniformly descending, "V" shape. Rather, these terms are used herein to more broadly cover any shape where the groove, or the entrance/exit formed by the groove, defines a linearly or non-linearly reducing width for at least a portion of the depth of the groove and includes, for example, V-shaped grooves, U-shaped grooves, multi-faceted V-shaped grooves, or combinations thereof.

The fiber accommodating grooves of the V-groove chip may advantageously extend along a direction of the array of output axes 14 of the array of optical fibers 10, but variations in this respect are also included within the scope of this disclosure. It is contemplated that a variety of optical fiber array configurations are contemplated by the present disclosure including, for example, 4, 8, or 12 channel fiber arrays. It is also contemplated that the fiber accommodating grooves 42 may extend along the entire length of the V-groove chip 40 to allow for convenient and precise means of manufacture and assembly because the V-grooves of the V-groove chip can be formed with optimum manufacturing precision and can be placed in the fiber array assembly in a variety of configurations with optimum adaptability.

Each of the input and output-side anti-recovery plates 20, 30 comprises a pair of recovery plate edges 25, 35 positioned on opposite sides of the array of optical fibers 10 along a width dimension w of the array of optical fibers 10. Recovery plate edges 25, 35 on a common side of the input and output-side anti-recovery plates 20, 30 are secured to a common face of one of the opposing lateral anti-recovery plates 50, 52 to fix the input and output-side anti-recovery plates 20, 30 relative to each other. In addition, a guided portion 15 of the array of optical fibers 10 is positioned in the fiber accommodating grooves 42 of the V-groove chip 40 and the V-groove chip 40 is secured to the fixed output-side anti-recovery plate 30. In this manner, the fiber accommodating grooves 42 and a fiber guiding face 22 of the input-side anti-recovery plate 20 are fixed at a relative angle θ. Although not required, it is contemplated that the angle θ may correspond to the angle of the bend 16 in the array of optical fibers 10.

As is illustrated in FIGS. 1-3, the V-groove chip 40 may be positioned on the interior side of the array of optical fibers 10, relative to the bend 16 in the array of optical fibers 10. Alternatively, it is contemplated that the V-groove chip 40 may be positioned on an exterior side of the array of optical fibers 10, relative to the bend 16 in the array of optical fibers 10. In the illustrated embodiment, the array of output axes 14, the output-side anti-recovery plate 30, and the v-groove chip 40 terminate at a common polished end face C of the bend inducing fiber array unit 100 to define a multi-fiber ferrule, although other configurations are contemplated, including those were the optical fibers 10 extend beyond the V-groove chip and the bend inducing fiber array unit 100.

It is contemplated that the array of optical fibers 10 may be secured to the fiber guiding face 22 of the input-side anti-recovery plate 20 along the input axes thereof and that the input-side anti-recovery plate 20 may be formed as a mono-planar structure by terminating the plate 20 at either of the lines of demarcation indicated in the region A of FIG. 3. It is also contemplated that the input-side anti-recovery plate 20 may comprise a staging area 24 along a portion of the array of input axes 12 of the array of optical fibers 10. A bonding agent 70, such as an epoxy, may be provided to secure the array of optical fibers 10 to the staging area 24 of the input-side anti-recovery plate 20. To facilitate application of the bonding agent and other access to the array of optical fibers 10, the staging area 24 may established such that it is clear of interference by the output-side anti-recovery plate 30 or any structure secured between the opposing lateral anti-recovery plates 50, 52.

Referring now to the output-side anti-recovery plate 30, it is contemplated that the V-groove chip 40 may be secured in place by fixing the V-groove chip 40 to the fixed output-side anti-recovery plate 30, or by other means, such as securement to the opposing lateral anti-recovery plates 50, 52. In the illustrated embodiments, the fixed output-side anti-recovery plate 30 is secured to the V-groove chip 40 on a side of the V-groove chip 40 that includes the fiber accommodating grooves 42. In this manner, the optical fibers of the array 10 can be secured between the output-side anti-recovery plate 30 and the V-groove chip 40.

Figure 4:
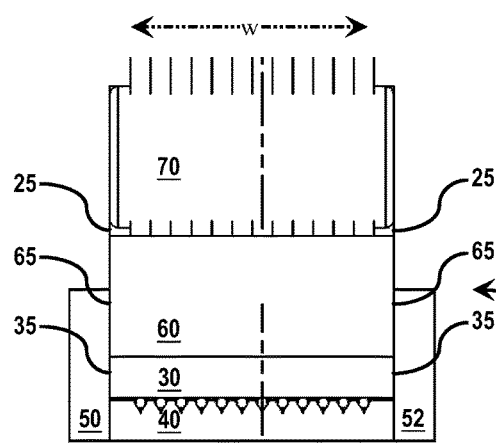
FIGS. 4 and 5 illustrate a bend inducing fiber array unit according to an alternative embodiment of the present disclosure.
Figure 5:
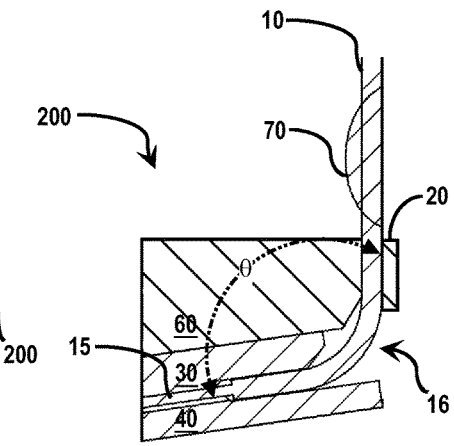

As is illustrated in FIGS. 1-3, and in the alternative fiber array unit 200 of FIGS. 4-5, the fiber array unit 100, 200 may comprise at least one supplemental output-side anti-recovery plate 60 to provide further resistance to the recovery forces of the bent fiber array 10. The supplemental output-side anti-recovery plate 60 may comprise a pair of lateral edges 65 positioned on opposite sides of the array of optical fibers 10. These lateral edges 65 can be secured to the opposing lateral anti-recovery plates 50, 52 to further fix the input and output-side anti-recovery plates 20, 30 relative to each other.

FIGS. 6 and 7 illustrate a contemplated alternative bend inducing fiber array unit 300 where the input-side anti-recovery plate 20 is an integral part of a fiber array unit frame comprising the input-side anti-recovery plate 20 and supplemental output side anti-recovery plates 60. It this embodiment, it is contemplated that the fiber array unit frame may be constructed of a plastic or metal, and may comprise an input-side staging area 24 and an output-side holding area 34. The staging area 24 of the fiber array unit frame is advantageously configured to be clear of interference by the output-side anti-recovery plate 30. In addition, the output-side holding area 34 may comprise interfering hardware, like flange 34A, which can be configured to be positioned on opposing interior and exterior sides of the array of optical fibers 10.

Referring to the bend 16 in the array of optical fibers 10, in some embodiments, the bend may be characterized by a minimum bend radius between about 1.5 mm and about 10 mm between the input axes and the output axes of the optical fibers 10. More specifically, the bend 16 may be characterized by a bend radius between about 3.5 mm and about 8.0 mm, or between about 5.0 mm and about 6.5 mm. In addition, the relative angle θ between the fiber accommodating grooves 42 and the fiber guiding face 22 of the input-side anti-recovery plate 20 can be between about 30 degrees and about 145 degrees, between about 45 degrees and about 130 degrees, between about 60 degrees and about 115 degrees, or, more specifically, between about 82 degrees and about 98 degrees. In some embodiments, the bend may comprise a length of about 2 mm to about 5 mm along a direction of the array of input axes 12 and a length of about 2 mm to about 5 mm along a direction of the array of output axes 14 or, more particularly, a length of about 3 mm to about 4 mm along both directions.

The input-side anti-recovery plate 20, the output-side anti-recovery plate 30, and the opposing lateral anti-recovery plates 50, 52 may be introduced as metal plates, while the V-groove plate 40 may be manufactured from silicon, quartz, fused silica, or an optical glass, such as a borosilicate glass. In many cases, it will be preferable to ensure that the V-groove plate exhibits a thermal expansion coefficient approximating that of the optical fibers. It is also contemplated that the various anti-recovery plates could also be manufactured from silicon, quartz, fused silica, or an optical glass. In some embodiments, the various plates of the fiber array unit are between about 2 mm and 8 mm thick.

Referring to FIG. 12, it is also contemplated that bend inducing fiber array units according to the present disclosure may further comprise one or more additional arrays of optical fibers 10, 10', in which case the bend inducing fiber array unit would further comprise an additional V-groove chip 40'. In such embodiments, the V-groove chips 40, 40' can be positioned with their respective fiber accommodating grooves opposing each other and the bend inducing fiber array unit may comprise a fiber spacer 80 positioned between respective arrays of optical fibers 10, 10' that are accommodated in the V-groove chips 40, 40'. The assembly may further comprise a pair of chip spacing fibers 90 positioned between the V-groove chips 40, 40' along opposite lateral edges of the V-groove chips on opposite sides of the arrays of optical fibers 10, 10'.

It is also noted that recitations herein of "at least one" component, element, etc., should not be used to create an inference that the alternative use of the articles "a" or "an" should be limited to a single component, element, etc.

For the purposes of describing and defining the present invention it is noted that the term "about" is utilized herein to represent the inherent degree of uncertainty that may be attributed to any quantitative comparison, value, measurement, or other representation. The term "about" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A bend inducing fiber array unit comprising:
   an array of optical fibers comprising an array of input axes, an array of output axes, and a bend extending across a width of the array of optical fibers between the input axes and the output axes;
   an input-side anti-recovery plate;
   an output-side anti-recovery plate;
   a planar V-groove chip comprising a plurality of fiber accommodating grooves extending across the planar V-groove chip to define a plurality of V-shaped entrances on an input edge of the planar V-groove chip and a plurality of V-shaped exits on an output edge of the planar V-groove chip;
   a first lateral anti-recovery plate arranged on a first side of the input and output-side anti-recovery plates; and a second lateral anti-recovery plate arranged on a second side of the input and output-side anti-recovery plates, opposite the first lateral anti-recovery plate, wherein
each of the input and output-side anti-recovery plates comprises a pair of lateral edges positioned on opposite sides of the array of optical fibers,
lateral edges on a first side of the input and output-side anti-recovery plates are secured to a common face of the first lateral anti-recovery plate to fix the input and output-side anti-recovery plates relative to each other,
lateral edges on a second side of the input and output-side anti-recovery plates are secured to a common face of the second lateral anti-recovery plate to fix the input and output-side anti-recovery plates relative to each other,
the input-side anti-recovery plate comprises a staging area along a portion of the array of optical fibers corresponding to the array of input axes of the array of optical fibers and the fiber array unit further comprises a bonding agent securing the array of optical fibers to the staging area of the input-side anti-recovery plate,
the staging area of the input-side anti-recovery plate is clear of interference by the output-side anti-recovery plate or any structure secured between the opposing lateral anti-recovery plates,
the planar V-groove chip is secured in the fiber array unit as a planar component that is separated from the input-side and output-side anti-recovery plates and from the first and second lateral anti-recovery plates for independent positioning of the V-groove chip within the fiber array unit,
a guided portion of the array of optical fibers is positioned in the fiber accommodating grooves of the planar V-groove chip, and
the planar V-groove chip is secured to the fixed output-side anti-recovery plate such that the fiber accommodating grooves and a fiber guiding face of the input-side anti-recovery plate are fixed relative to each other at an angle $\theta$.

2. The bend inducing fiber array unit of claim 1 wherein the fiber accommodating grooves extend along an entire length of the planar V-groove chip and the planar V-groove chip is positioned on an interior side of the array of optical fibers, relative to the bend in the array of optical fibers.

3. The bend inducing fiber array unit of claim 1 wherein the fiber accommodating grooves extend along an entire length of the planar V-groove chip and the planar V-groove chip is positioned on an exterior side of the array of optical fibers, relative to the bend in the array of optical fibers.

4. The bend inducing fiber array unit of claim 1 wherein the array of output axes of the array of optical fibers and the output edge of the planar V-groove chip terminate at a common face of the bend inducing fiber array unit to define a multi-fiber ferrule.

5. The bend inducing fiber array unit of claim 1 wherein the array of optical fibers is secured to the fiber guiding face of the input-side anti-recovery plate along a portion of the array of optical fibers corresponding to the array of input axes of the array of optical fibers.

6. The bend inducing fiber array unit of claim 1 wherein the planar V-groove chip is secured to the fixed output-side anti-recovery plate along a portion of the array of optical fibers corresponding to the array of output axes of the array of optical fibers.

7. The bend inducing fiber array unit of claim 1 wherein the fixed output-side anti-recovery plate is secured to the planar V-groove chip on a side of the planar V-groove chip comprising the fiber accommodating grooves to secure the optical fibers between the output-side anti-recovery plate and the planar V-groove chip.

8. The bend inducing fiber array unit of claim 1 wherein:
the fiber array unit comprises at least one supplemental output-side anti-recovery plate;
the supplemental output-side anti-recovery plate comprises a pair of lateral edges positioned on opposite sides of the array of optical fibers; and
the lateral edges of the supplemental output-side anti-recovery plate are secured to opposing lateral anti-recovery plates to further fix the input and output-side anti-recovery plates relative to each other.

9. The bend inducing fiber array unit of claim 1 wherein the input-side anti-recovery plate is an integral part of a fiber array unit frame comprising the input-side anti-recovery plate and a supplemental output side anti-recovery plate.

10. The bend inducing fiber array unit of claim 9 wherein:
the fiber array unit frame comprises a staging area along a portion of the array of optical fibers corresponding to the array of input axes of the array of optical fibers and an output-side holding area along a portion of the array of optical fibers corresponding to the array of output axes of the array of optical fibers;
the staging area of the fiber array unit frame is clear of interference by the output-side anti-recovery plate; and
the output-side holding area of the fiber array unit frame comprises interfering hardware positioned on opposing interior and exterior sides of the array of optical fibers, relative to the bend in the array of optical fibers.

11. The bend inducing fiber array unit of claim 1 wherein the relative angle $\theta$ between the fiber accommodating grooves and the fiber guiding face of the input-side anti-recovery plate is between about 30 degrees and about 145 degrees.

12. The bend inducing fiber array unit of claim 1 wherein the relative angle $\theta$ between the fiber accommodating grooves and the fiber guiding face of the input-side anti-recovery plate is between about 82 degrees and about 98 degrees.

13. The bend inducing fiber array unit of claim 1 wherein the bend comprises a length of about 3 mm to about 4 mm along a direction of the array of input axes and a length of about 3 mm to about 4 mm along a direction of the array of output axes.

14. The bend inducing fiber array unit of claim 1 wherein:
the input-side anti-recovery plate, the output-side anti-recovery plate, and the opposing lateral anti-recovery plates are metal plates; and
the planar V-groove chip is manufactured from silicon, quartz, fused silica, or an optical glass.

15. The bend inducing fiber array unit of claim 1 wherein:
the bend inducing fiber array unit further comprises an additional array of optical fibers comprising an additional bend positioned on an interior side of the array of optical fibers, relative to the bend in the array of optical fibers; and
the bend inducing fiber array unit further comprises an additional planar V-groove chip comprising a plurality of additional fiber accommodating grooves extending across the additional planar V-groove chip to define a plurality of additional V-shaped entrances on an input edge of the additional planar V-groove chip and an additional plurality of V-shaped exits on an output edge of the additional planar V-groove chip.

16. The bend inducing fiber array unit of claim 15 wherein:
- the planar V-groove chips are positioned with their respective fiber accommodating grooves opposing each other; and
- the bend inducing fiber array unit comprises a fiber spacer positioned between respective arrays of optical fibers accommodated in the planar V-groove chips.

* * * * *

UNITED STATES PATENT AND TRADEMARK OFFICE
CERTIFICATE OF CORRECTION

PATENT NO. : 10,012,804 B2
APPLICATION NO. : 15/581195
DATED : July 3, 2018
INVENTOR(S) : Wen-Lung Kuang et al.

Page 1 of 1

It is certified that error appears in the above-identified patent and that said Letters Patent is hereby corrected as shown below:

On the Title Page

In Column 2, primary Examiner, Line 1, delete "Tavlkaev" and insert -- Tavlykaev --, therefor.

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*